Patented June 30, 1953

2,643,987

UNITED STATES PATENT OFFICE 2,643,987

PREPARATION OF MIXTURES OF RUBBERY BUTADIENE STYRENE COPOLYMER WITH HARD RESINOUS SATURATED COPOLYMER OF STYRENE AND ANOTHER UNSATURATED COMPOUND

Stuart A. Harrison, Stow, Ohio, and Walter E. Brown, Cambridge, Mass., assignors to The B. F. Goodrich Company, New York, N. Y., a corporation of New York No Drawing. Original application May 23, 1946, Serial No. 671,897, now Patent No. 2,614,089, dated October 14, 1952. Divided and this application January 5, 1952, Serial No. 272,504

1 Claim. (Cl. 260—45.5)

This invention relates to synthetic polymeric materials and to a method of preparing the same, and is especially concerned with the preparation of polymeric materials in which a rubbery copolymer of a butadiene-1,3 hydrocarbon and another polymerizable compound such as styrene is uniformly and intimately combined with a hard resinous saturated copolymer of a major proportion of styrene with a minor proportion of another unsaturated compound.

Rubbery copolymers of a butadiene-1,3 hydrocarbon with styrene or its equivalents, constitute a well known class of materials. Such materials (often called "butadiene styrene synthetic rubbers") are characterized chemically by possessing long carbon chains containing a multiplicity of intra-chain carbon to carbon double bonds, that is, they are high molecular weight (a molecular weight generally above 50,000) linear polymers with a high degree of aliphatic unsaturation (iodine numbers generally above about 50); and are characterized physically by a resemblance to natural rubber in that they are capable of being converted from an essentially plastic workable condition to a highly elastic condition by vulcanization, as by heating with sulfur.

Although such butadiene styrene synthetic rubbers resemble natural rubber in many respects and are even superior thereto in certain respects, they also possess an outstanding disadvantage as compared to natural rubber. This disadvantage resides in the fact that they are generally much weaker and much less elastic when vulcanized in a "pure gum" recipe (that is, a recipe which includes the rubbery material and vulcanizing ingredients but is free from significant amounts of other compounding ingredients such as pigments, fillers, softeners, etc.) than is natural rubber. For example, "pure gum" vulcanizates of natural rubber possess a tensile strength ranging from 2,000 to 3,000 lbs./sq. in. or more and are highly elastic, whereas "pure gum" vulcanizates of such synthetic rubbers possess tensile strengths generally less than 1,000 lbs./sq. in., and often as low as 200 to 500 lbs./sq. in., and are not nearly so elastic. As a result, such synthetic rubbers must be compounded with carbon black (which remarkably reinforces the synthetic rubber, to an extent even greater than it does with natural rubber) to attain sufficient strength to be useful, even though this is undesirable in many instances because of the black coloration and the increased stiffness of the composition.

Another class of polymeric materials, quite different in properties from the rubbery butadiene-1,3 styrene copolymers, are the hard, solid, resinous, saturated copolymers of a major proportion of styrene with a minor proportion of copolymerizable monomer. These materials are also high molecular weight polymers (molecular weight generally above 50,000) containing long carbon chains, but they differ from the rubbery copolymers in that these chains are substantially saturated (the double bonds of the monomer disappearing on polymerization), and as a result the polymer possesses an iodine number of zero or thereabouts. In physical properties these materials also differ from rubbery materials since they are hard and stiff at ordinary temperatures (having a Brinell hardness number in the unplasticized condition within the range of about 10 to 50 as measured on the Brinell apparatus using a 2.5 mm. ball with a 25 kg. load); they are not appreciably elastic unless mixed with plasticizers; and they are not vulcanizable in the manner of natural rubber. Moreover, they are thermoplastic whereas the rubbery copolymers stiffen at elevated temperatures.

One of the principal objects of this invention is to provide a method whereby rubbery butadiene-1,3 styrene copolymers and hard saturated resinous styrene copolymers may be intimately combined with one another.

A second principal object is to provide a new class of synthetic polymeric materials, which are rubbery and vulcanizable in nature, and which resemble natural rubber, rather than butadiene styrene synthetic rubber, in that they may be vulcanized in a "pure gum" recipe to produce strong snappy vulcanizates having a tensile strength above 1,000 lbs./sq. in., yet are far superior to natural rubber in resistance to oxidation, to chemicals and to other deteriorating influences.

Numerous other objects will be apparent hereinafter.

The first of the principal objects is attained by the method of this invention, which method comprises the steps of emulsifying a monomeric mixture polymerizable in aqueous emulsion to form an unsaturated rubbery copolymer, and comprising a butadiene-1,3 hydrocarbon and a copolymerizable compound such as styrene, in an aqueous emulsifying medium containing dispersed solid particles of a hard saturated resinous styrene copolymer, and then polymerizing the said monomeric material while so emulsified. A most convenient way of proceeding is to polymerize the mixture of butadiene-1,3 hydrocarbon and copolymerizable compound in aqueous emulsion in the usual manner except that the polymerization is carried out in the presence of a previously prepared aqueous dispersion or latex of the saturated resinous styrene copolymer. When practicing this method (sometimes referred to hereinafter for sake of brevity as "seeding" the emulsion copolymerization forming a butadiene styrene copolymer with hard saturated resinous styrene copolymer), it has been found that formation of rubbery copolymer occurs on the surfaces of the particles of saturated resinous polymer to produce an aqueous dispersion in which the rubbery copolymer and the saturated resin are present in the same individual particles. As a result, coagulation of the dispersion produces a polymeric material in which the rubbery copolymer and the saturated resinous copolymer are uniformly and intimately combined, regardless of whether they are soluble in one another.

When the hard saturated resinous styrene copolymer is present in a proportion less than that of the rubbery copolymer, the second of the above-stated objects is attained. For in this instance it has been found that the aqueous dispersion obtained by the polymerization consists of particles containing a core of the hard saturated resinous styrene copolymer surrounded by a covering of vulcanizable rubbery copolymer, and that coagulation of this dispersion yields a rubbery vulcanizable polymeric material comprising small discrete particles of hard saturated resin evenly and intimately dispersed or embedded in a continuous phase of the rubbery copolymer. Such copolymeric materials closely resemble natural rubber in that they are strong and elastic, yet soft and flexible, when vulcanized in a "pure gum" recipe. They are quite useful in the production of many articles customarily made from "pure gum" rubber compounds such as nursing nipples, rubber thread, stationers' bands, surgical goods, etc., which are superior to those made from butadiene styrene synthetic rubber because of a much greater strength and elasticity and are superior to those made from natural rubber because of a greater resistance to various deteriorating influences. Additionally, these polymeric materials may be compounded with fillers, pigments, etc. and vulcanized to produce improved compositions useful for the same multifarious purposes as are other rubbery materials, such compounded materials being particularly useful for applications where it is undesirable to use carbon black as in producing white and brightly colored compositions and in electrical insulation.

The practice of the invention in preferred embodiments may be illustrated by the following specific examples in which all parts are by weight.

EXAMPLE

*Seeding emulsion copolymerization of butadiene-1,3 and styrene divinyl benzene copolymer with latex of styrene resin*

In this example a mixture of 75 parts of butadiene-1,3 and 25 parts of styrene is emulsified with 75 parts of a 5% aqueous soap solution, 0.3 part of potassium persulfate, 0.5 part of n-dodecyl mercaptan and with a latex of saturated styrene resinous copolymer containing 24.8 parts of dispersed resinous copolymer and sufficient soap solution to make a total of 180 parts of water. The styrene copolymer latex used contains a hard benzene-insoluble copolymer of styrene and divinyl benzene, and is prepared by the polymerization in aqueous emulsion in the presence of soap and potassium persulfate of a monomeric mixture consisting of 95% monomeric styrene and 5% divinyl benzene. The emulsion containing the monomeric butadiene-1,3 and styrene and the styrene divinyl benzene copolymer particles is then agitated at 50° C. for about 15 hours, whereupon about 80% of the butadiene-1,3 and styrene is polymerized upon the particles of styrene divinyl benzene copolymer. The resulting dispersion is coagulated to yield polymeric material comprising 31 parts of resinous styrene divinyl benzene copolymer for each 100 parts of rubbery butadiene-1,3 styrene copolymer. The polymeric material is then compounded in a "pure gum" recipe with 10 parts of litharge, 5 parts of zinc oxide, 5 parts of coal tar and 2 parts of sulfur for each 100 parts of butadiene styrene copolymer present, and vulcanized for 45 minutes at 307° F. The physical properties of the vulcanized polymeric material is as follows:

| | | |
|---|---|---|
| Tensile strength | lbs./sq. in | 2600 |
| Ultimate elongation | per cent | 650 |
| Modulus at 300% elongation | lbs./sq. in | 2500 |

It is seen that the resinous styrene divinyl benzene copolymer increases the tensile strength and elasticity of the rubbery copolymer.

Results substantially equivalent to those set forth in the example are secured by substituting for the specific styrene copolymer resin latex used, other latices of hard saturated resinous polymers prepared by the polymerization in aqueous emulsion of a major proportion up to 95% by weight of styrene or other alkenyl substituted aromatic compounds of the formula

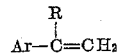

wherein Ar is an aromatic radical having its connecting valence on a ring carbon atom and R is hydrogen or alkyl, such as alpha-methyl styrene, p-methyl styrene, dichloro styrene, p-cyano styrene, p-methoxy styrene, vinyl naphthalene or the like, with lesser amounts of other compounds copolymerizable therewith to yield hard saturated resins including monomers containing a single olefinic double bond such as vinyl chloride, vinylidene chloride, methyl acrylate, methyl methacrylate, acrylonitrile and the like and also monomers containing two or more double bonds which are not conjugated such as divinyl benzene, dimethallyl, diallyl maletate, diallyl phthalate, allyl cinnamate, trimethallyl phosphate, the dicinnamate of 1,4-dioxanediol-2,3,2-chloroallyl crotonate, allyl methacrylate, diallyl ketone and the like.

A particularly useful hard saturated resinous styrene copolymer in addition to that used in the example is a latex containing about 30% by weight of small particles of hard resinous copolymer of about 80 parts of styrene and 20 parts of acrylonitrile preparable, for example, by emulsifying 80 parts of monomeric styrene and 20 parts of acrylonitrile with 0.35 part of triisobutyl mercaptan as a polymerization modifier, and 0.2 part of p-methoxy-phenyl-diazothio-beta-naphthyl ether as a polymerization promoter in 300 parts of water containing 5 parts of fatty acid soap as emulsifying agent and 0.3 part of potassium ferricyanide as a polymerization catalyst and then polymerizing the emulsified monomers at 50° C. for 8 hours.

In the examples the monomeric mixture of butadiene-1,3 hydrocarbon and copolymerizable compound which is polymerized to form a rubbery copolymer, has been a mixture of butadiene-1,3 and styrene. Various other mixtures are substantially equivalent in this respect to the specific mixtures used and may be substituted therefor. For example, there may be used mixtures containing a predominant amount of any butadiene-1,3 hydrocarbons such as butadiene-1,3, isoprene, 2,3-dimethyl butadiene-1,3 or pipeylene or a combination of two or more of these and a lesser amount of one or more of the following monomers: styrene, alpha-methyl styrene, p-methoxy styrene, p-chloro styrene, dichloro styrene, vinyl naphthalene and other alkenyl substituted aromatic compounds of the formula

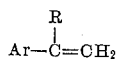

wherein Ar is an aromatic radical having its connecting valence on a ring carbon atom and R is hydrogen or alkyl.

It is preferred that the saturated resinous styrene copolymer be prepared by polymerization in aqueous emulsion and that the dispersion or latex obtained be utilized to supply the resin, and it is also preferred that the particles of resin in the latex be no greater than about 0.4 micron in average diameter, and more preferably less than about 0.1 micron in average diameter, but other procedures for supplying the resin in dispersed form are also included. It is also preferred that the resin possess a Brinell hardnes number within the range of about 10 to 50 when measured on the Brinell apparatus using a 2.5 mm. ball with a 25 kg. load, as do the resins used in the specific examples.

The precise proportion of hard saturated resinous styrene copolymer employed in producing the polymeric products of the invention may be varied throughout the range of 1 to 100 parts of resin for each 100 parts of rubbery copolymer produced in the polymerization, and in each instance a rubbery vulcanizable polymeric material of considerably higher tensile strength than the rubbery copolymer alone is obtained. However, polymeric materials most useful for most purposes are secured when the proportion of hard saturated resin is from about 5 to 80 parts, more preferably from about 15 to 60 parts, to each 100 parts of rubbery copolymer, since such polymeric materials when vulcanized give strong snappy "pure gum" vulcanizates resembling those obtainable from natural rubber. When the proportion of resin is increased to about 80 to 100 parts for each 100 parts of rubbery copolymer, the polymeric materials are still capable of vulcanization but are somewhat stiffer and more like leather when vulcanized.

In addition to the above-discussed modifications and variations in the nature and proportions of essential materials used in practicing the invention, other modifications and variations from the specific examples are also possible. Thus, in polymerizing the monomer mixture containing butadiene-1,3 hydrocarbon and styrene in aqueous emulsion in the presence of a dispersion of the resin, use may be made of any of the various emulsifying agents, polymerization catalysts, polymerization modifiers, etc. commonly employed in the polymerization of butadiene-1,3 hydrocarbon containing mixtures in aqueous emulsion. The conditions of polymerization such as time and temperature and degree of agitation may also be varied in accordance with established procedures. Similar variations may be made in the polymerization to form the hard saturated resin if it is formed by previous polymerization in aqueous emulsion.

The products of the polymerizations described are first obtained in the form of an aqueous dispersion or latex. These latices may be used as such or they may be coagulated by any of the methods well known to the art, to yield the polymeric product in solid form. At this stage, the polymeric products of this invention comprise a continuous phase of rubbery copolymer in which there is dispersed small discrete particles of hard saturated resin. Compounding ingredients such as softeners, plasticizers, pigments, fillers, colors, stabilizing agents, antioxidants, vulcanizing ingredients, etc. may be added to the dispersion before coagulation or to the solid polymeric products after coagulation in the manner well known to the art, if desired, it being understood that the presence or absence of such materials will depend primarily upon the use to be made of the finished product and is in no way critical in this invention.

It will be apparent from the above description that the invention is not limited to the specific embodiments set forth, but only as required by the spirit and scope of the appended claim.

This application is a division of copending application Serial No. 671,897, filed May 23, 1946, now Patent No. 2,614,089.

We claim:

The method of preparing a resin-rubber mixture which comprises incorporating in a binary styrene-acrylonitrile copolymer synthetic resin latex, the synthetic resin particles of which have a major proportion up to 95% by weight of styrene component, a mixture of butadiene and styrene, the butadiene content of said mixture being 30–90% by weight and the styrene content of said mixture being correspondingly 70% to 10% by weight, subjecting the same to polymerizing conditions and continuing the polymerization until the butadiene-styrene copolymer synthetic rubber is 75% to 50% of the thus formed resin-rubber mixture, and coagulating and separating the thus formed mixture of synthetic resin and synthetic rubber from the aqueous medium.

STUART A. HARRISON.
WALTER E. BROWN.

References Cited in the file of this patent

UNITED STATES PATENTS

| Number | Name | Date |
|---|---|---|
| 2,257,078 | Soday | Sept. 23, 1941 |
| 2,388,685 | Guss et al. | Nov. 13, 1945 |

OTHER REFERENCES

Kolthoff et al., Rubber Chem. and Tech., Apr. 1947.

Blout et al., "Monomers," published by Interscience Publishers, N. Y. 1949, Styrene, pgs. 7-16.